United States Patent [19]

Samson

[11] Patent Number: 4,773,291
[45] Date of Patent: Sep. 27, 1988

[54] LATHE WAY TOOL HOLDER

[76] Inventor: Barak E. Samson, P.O. Box 1887, Lakeland, Fla. 33802

[21] Appl. No.: 71,919

[22] Filed: Jul. 10, 1987

[51] Int. Cl.$^4$ ............................................... B23B 3/36
[52] U.S. Cl. .................... 82/21 R; 82/34 R; 82/36 R; 82/37
[58] Field of Search ............ 82/21 R, 24 R, 34 R, 82/34 A, 34 B, 34 C, 34 D, 32, 36 B, 33 A, 29 A, 29 B, 29.1, 28 A, 28.2, 36 R

[56] References Cited

U.S. PATENT DOCUMENTS

| | | | |
|---|---|---|---|
| 117,513 | 8/1871 | Chormanns | 82/24 R |
| 389,012 | 9/1888 | Rivett | 82/36 R |
| 1,619,281 | 3/1927 | White | 82/21 R |
| 2,581,602 | 1/1952 | Pulsifer | 82/24 R |
| 3,593,602 | 7/1970 | Westrom | 82/33 A |

Primary Examiner—Frederick R. Schmidt
Assistant Examiner—Blynn Shideler
Attorney, Agent, or Firm—Macdonald, J. Wiggins

[57] ABSTRACT

An auxiliary carriage and lathe tool holder for a turning lathe is removably and slidably mounted on the lathe ways and includes a concave upper surface between the ways. The auxiliary carriage includes a tool holding slot in one edge thereof and a tool clamping bar. The auxiliary carriage is connected to the lathe tool carriage to permit longitudinal feeding of a tool held in the slot. The auxiliary carriage permits turning work of a greater diameter than possible with the lathe tool carriage.

9 Claims, 1 Drawing Sheet

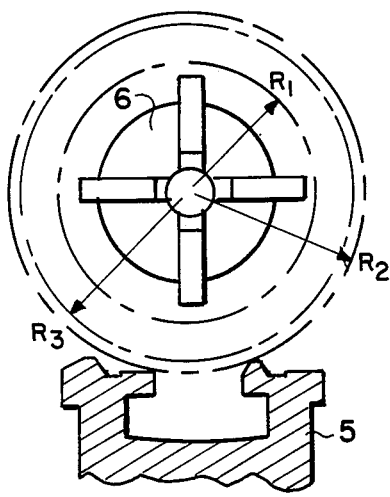
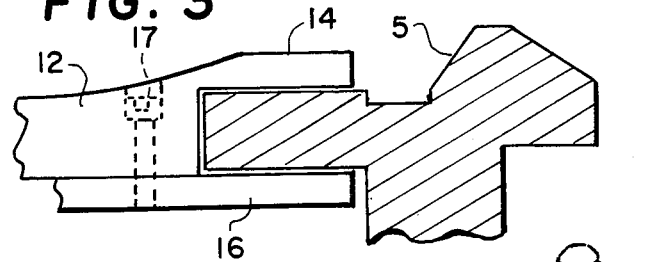
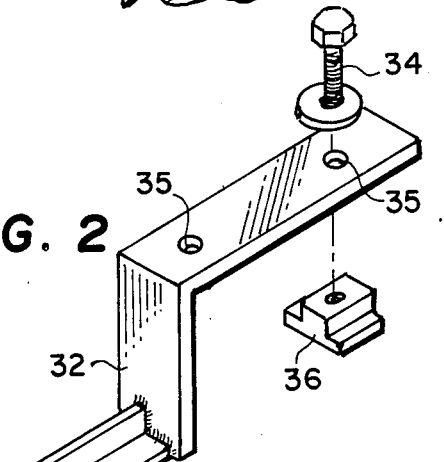
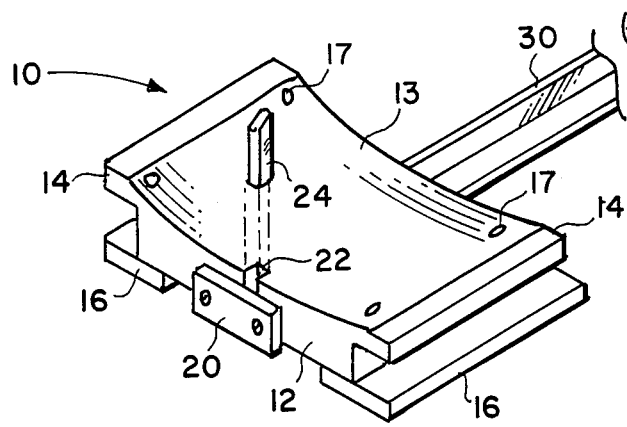
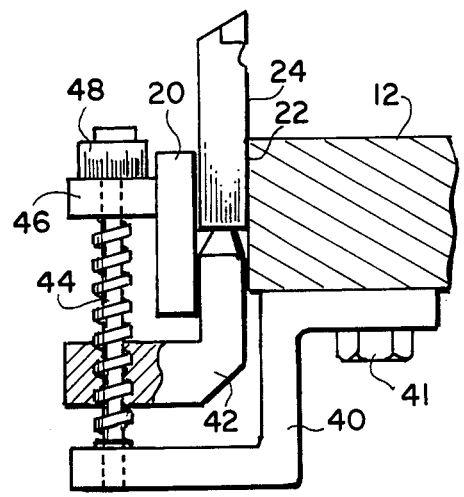
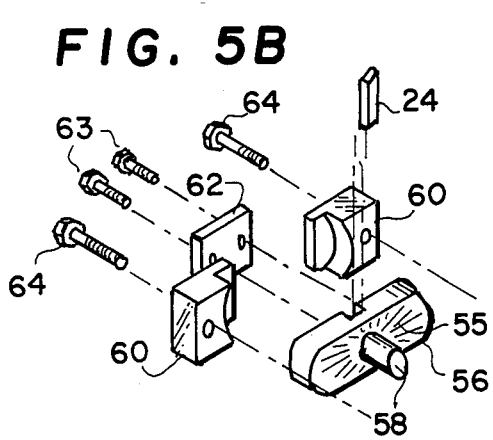
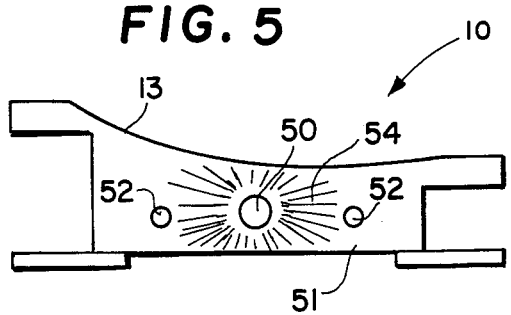

LATHE WAY TOOL HOLDER

BACKGROUND OF THE INVENTION

1. Field of the Invention

The present invention relates to tool holders for turning lathes and, more specifically to a tool holder mounting to the ways of a lathe to permit a larger swing than possible with using the carriage tool holder.

2. Description of the Prior Art

General purpose lathes for turning metal stock and the like have a set of lathe ways which mount a tool carriage movable longitudinally and laterally for feeding of a cutting tool. The carriage carries the tool holder into which the cutting tool is mounted. When turning the outer diameter of stock, the radius of such turning is limited by interference of the carriage and tool holder with the work. Due to the necessity for a certain bulk in the carriage portion of the lathe, the turning radius is thus limited to less than the distance from the chuck center to the lathe ways.

A machine shop will purchase a metal turning lathe having sufficient capacity for the normally expected work. However, on occasion, a need may arise to turn a somewhat greater radius work but of a frequency not warranting the purchase of a larger lathe. Therefore, there is a need for a tool holder which will permit a turning radius slightly less than the distance from the chuck center to the lathe ways.

SUMMARY OF THE INVENTION

The present invention is an auxiliary carriage for a turning lathe which may be slidably attached directly to the lathe ways and having tool holding capabilities at a location between the ways. The auxiliary carriage includes a spanning member attached to an end of the auxiliary carriage and disposed between and parallel to the lathe ways. The distal end of the spanning member has a bracket attached thereto which is mounted to the T-slots in the lathe carriage with the carriage cross feed centered with respect to the lathe ways. Thus, the lathe carriage feed may be operated longitudinally moving the auxiliary carriage along the ways.

Work mounted in the lathe chuck and having a radius slightly less than the distance from the chuck center to the lathe ways may have an outside cut made by setting the tool in the auxiliary carriage to the desired cut depth and feeding the auxiliary carriage longitudinally by means of the main carriage feed. Thus, the invention permits making cuts on large castings or other work which would otherwise require the use of a larger turning lathe.

It is therefore a principal object of the invention to provide an auxiliary carriage for a turning lathe which will ride on the lathe ways with a cutting tool mounted between the ways to thereby permit outside turnings of a radius greater than possible when using the lathe tool carriage.

It is another object of the invention to provide an auxiliary carriage for increasing the swing of a lathe temporarily which can be quickly attached to and detached from the lathe.

These and other advantages and objects of the invention will become apparent from the following detailed description when read in conjunction with the drawings.

BRIEF DESCRIPTION OF THE DRAWINGS

FIG. 1 illustrates diagramatically the manner in which the auxiliary carriage of the invention increases the swing capacity of a lathe;

FIG. 2 is a perspective view of the auxiliary carriage and mounting structure of the invention;

FIG. 3 is a cross-sectional view of a portion of a lathe way having the auxiliary carriage of FIG. 2 shown in partial form attached thereto;

FIG. 4 shows a cross-sectional view of the auxiliary carriage of the invention having means for accurately adjusting the cutting tool vertically; and FIGS. 5A and 5B show an alternative tool holder for attachment to the carriage which permits an angular adjustment of the cutting tool.

DETAILED DESCRIPTION OF THE PREFERRED EMBODIMENT

FIG. 1 illustrates a lathe chuck 6 on a lathe with ways 5 indicated in cross-section. Radius R1 indicates the maximum turning radius of the exemplary lathe when using the standard carriage. Radius R2 indicates the distance from the center of chuck 6 to a lathe way, and radius R3 illustrates a maximum turning radius utilizing the invention. As will be noted, the increase in turning radius will be the distance between radius R3 and radius R1.

As an example of the effectiveness of the invention, a Summit 28 twenty foot bed lathe has a maximum outside diameter cutting radius capacity of 23¾", which represented about 70% of the absolute maximum swing. By use of the auxiliary carriage of the invention, a capacity of 32¼" diameter was readily obtained, an increase of about 97% of the absolute maximum.

Turning to FIG. 2, a perspective view of the invention is shown as applied to the Summit 28 lathe. As will be understood, the invention is easily adapted to other makes of turning lathes.

The invention consists of an auxiliary carriage 10 having a tool carrier 12 with an upper surface thereof milled from a suitable material such as steel to have a concave surface 13. The radius of surface 13 is greater than R2 of FIG. 1. Mounting flanges 14 are provided on either end of carrier 12. As will be seen from FIG. 3, mounting flanges 14 rest on the lathe ways 5 with lathe way retaining plates 16 attached to the bottom of tool carrier 12. Plates 16 are drilled and tapped to accept retaining bolts 17 through openings in carrier 12. Preferably, retaining bolts 17 are recessed head bolts. As will be noted from FIG. 3, retaining plates 16 are mounted to retain the auxiliary carriage 10 to lathe way 5 and are removable when the auxiliary carriage is not needed. Carrier 12 includes a vertical slot 22 for receiving a cutting tool 24. Cutting tool 24 is held in place by tool clamp plate 20. Vertical adjustment of tool 24 is made by loosening the cap screws of plate 20 and manually moving tool 24 to the desired height; thereafter tightening clamp plate 20. As will be noted, a slight clearance is provided between flanges 14 and retaining plates 16 to permit auxiliary carriage 10 to slide on ways 5 with minimum play.

A spanning member 30 has a proximal end thereof attached to auxiliary carriage 10 by bolting, welding, or other means which extends longitudinally between the lathe ways when auxiliary carriage 10 is installed. As the distal end of spanning member 30, a bracket 32 is welded thereto having a pair of holes 35 in the horizontal portion thereof. Holes 35 are selected to match the spacing of the T-slots in the cross-feed portion of the lathe tool carriage. The tool carriage crossfeed is centered with respect to the lathe ways to permit bracket 32 to be fastened thereto with bolts, such as 34 and T-nuts such as 36, in the carriage T-slots. The cross-feed is locked in place and auxiliary carriage 10 may then be moved along the ways by means of the longitudinal feed portion of the carriage.

As will now be recognized, a large diameter work may be placed in the lathe chuck after installation of the auxiliary carriage 10, with the carriage moved clear of the work. Cutting tool 24 is installed in slot 22 and adjusted for the desired depth of cut. The auxiliary carriage 10 and tool 24 may then be fed through the work with the longitudinal carriage feed in normal fashion.

FIG. 4 illustrates a modified tool holder portion of auxiliary carriage 10 in which means for accurately adjusting the vertical position of cutting tool 24 is provided. Tool carrier 12 is shown in cross-sectional view through vertical tool slot 22 with clamp plate 20 in position, clamping cutting tool 24 in place. A bracket 40 is attached to the lower surface of tool carrier 12 and supports adjustment screw 44 which is preferably an Acme thread feed screw. Adjustment arm 42 is threaded to match the threads of adjustment screw 44 and disposed to support cutting tool 24 in slot 22 when clamp plate 22 is loosened. A screw support 46 is attached to clamp plate 20 and supports the upper end of adjustment screw 44. A head 48 is attached to adjustment screw 44 having suitable calibration marks such that cutting tool 24 may be adjusted by loosening the screws of clamp plate 20 slightly and turning adjustment screw 44 as required.

If it is desired to have an angular adjustment of cutting tool 24, the arrangement shown in FIGS. 5A and 5B is suitable. In FIG. 5A, auxiliary carriage 10 is shown in which auxiliary carriage member 51 is provided with a dowel hole 50 on the tool end thereof, a pair of tapped holes 52, and radial serrations 54. The tool is mounted in a tool holder 56 shown in FIG. 5B having a dowel 58 which is inserted into dowel hole 50 in carriage member 51. A pair of clamps 60 is mounted to auxiliary carriage member 12 by means of bolts 64 and threaded holes 52. As will be noted, clamp blocks 60 are recessed to accept the lateral ends of tool holder 56. Tool holder 56 includes serrations 55 such that, in combination with serrations 54 on carriage member 12, a friction lock action is provided when clamps 60 are tightened. Tool 24 is held in place in tool holder 56 by clamp plate 62 with clamp screws 63. When it is desired to adjust the angle of tool 24, screws 64 are slightly loosened and tool holder 56 rotated as required. Thereafter, bolts 64 are tightened, clamping tool holder 56 in the desired attitude.

As will now be understood, a novel cutting tool holder mounted directly to the lathe ways and movable therealong has been described. The lathe ways provide for total support for the tools and has been found to permit higher cutting speeds than usable for a tool mounted to the conventional tool post holder. As will be also noted, the cutting speeds are adjusted normally from the main carriage feed.

Although a design for a specific lathe has been disclosed, this is for exemplary purposes only and modifications are considered to fall within the spirit and scope of the invention.

I claim:

1. In a turning lathe having a set of lathe ways, a tool carriage, and a longitudinal carriage feed in which said tool carriage limits the turning radius of said lathe to a first turning radius, the improvement comprising:
    tool holding means for holding a lathe cutting tool in a position between said lathe ways to produce a second turning radius greater than said first turning radius;
    auxiliary carriage means for supporting said tool holding means having a concave upper surface transverse to said ways, said concave surface having a radius greater than said first turning radius of said lathe, said auxiliary carriage means slidably mounted to said lathe ways; and
    means for connecting said auxiliary carriage means to said tool carriage for longitudinal feeding of a tool held in said tool holding means.

2. The improvement as recited in claim 1 in which said auxiliary carriage means includes:
    a tool carrier having a pair of lateral flanges for resting on said lathe ways, said carrier having a concave upper surface between said flanges and a vertically oriented tool holding slot in a lateral edge of said carrier; and
    a pair of retaining plates, each of said plates removably attached to a lower surface of said carrier opposing said flanges for securing said carrier to said lathe ways.

3. The improvement as recited in claim 2 in which said tool holding means includes:
    a tool clamp attached to said lateral edge of said carrier for clamping a lathe cutting tool in said vertical slot.

4. The improvement as recited in claim 3 in which said tool clamp includes means for vertical adjustment of said cutting tool.

5. The improvement as recited in claim 4 in which said tool clamp includes means for angular adjustment of said cutting tool.

6. The improvement as recited in claim 1 in which said tool holding means includes tool position adjustment means.

7. The improvement as recited in claim 6 in which said means for connecting said auxiliary carriage to said tool carriage includes a rigid spanning member having a first end attached to said tool carrier and a second end removably attached to said tool carriage.

8. The improvement as recited in claim 7 in which said second end of said spanning member is attached to said tool carriage by means of T-bolts disposed in T-slots in said tool carriage.

9. An auxiliary carriage apparatus for a turning lathe, said lathe having a pair of lathe ways and a tool carriage having a longitudinal carriage feed in which the swing radius to said lathe ways is greater than a first turning radius permitted by said tool carriage, said auxiliary carriage permitting turning of work of greater radius than said first turning radius, comprising:
    a tool carrier removably disposed between said ways and having a concave upper surface transverse to said ways, said concave surface having a radius greater than said first turning radius of said lathe, said carrier having a pair of flanges and a pair of retaining plates for slidably attaching said carrier to said ways;
    a lathe cutting tool holder including an essentially vertical slot in a lateral edge of said carrier for accepting a lathe cutting tool for producing a cutting radius greater than said first turning radius, and a tool clamp attached to said lateral edge for clamping said tool in said slot; and
a spanning member having a first end attached to said tool carrier and a second end removably attached to said tool carriage whereby said longitudinal carriage feed moves said tool carrier and said tool longitudinally along said ways.

* * * * *